United States Patent [19]
Patterson

[11] 4,034,808
[45] July 12, 1977

[54] METHOD FOR PUMP-OFF DETECTION
[75] Inventor: Maurice M. Patterson, Houston, Tex.
[73] Assignee: Shell Oil Company, Houston, Tex.
[21] Appl. No.: 724,838
[22] Filed: Sept. 20, 1976
[51] Int. Cl.$^2$ .................. E21B 47/00; F04B 49/02; G01L 5/00
[52] U.S. Cl. ................. 166/250; 166/53; 166/65 R; 73/151
[58] Field of Search ............ 166/250, 53, 64, 65 R, 166/72, 314; 73/151, 141 A

[56] References Cited
U.S. PATENT DOCUMENTS

| | | | |
|---|---|---|---|
| 2,596,361 | 5/1952 | Blancher | 73/151 X |
| 2,845,125 | 7/1958 | Truman | 166/250 X |
| 3,343,409 | 9/1967 | Gibbs | 73/151 |
| 3,457,781 | 7/1969 | Elliott | 73/151 |
| 3,527,094 | 9/1970 | Yew et al. | 73/141 A |
| 3,559,731 | 2/1971 | Stafford | 166/53 |
| 3,817,094 | 6/1974 | Montgomery et al. | 73/151 |
| 3,824,851 | 7/1974 | Hagar et al. | 73/151 |
| 3,838,597 | 10/1974 | Montgomery et al. | 73/151 |
| 3,951,209 | 4/1976 | Gibbs | 166/250 |

*Primary Examiner*—Stephen J. Novosad

[57] ABSTRACT

A method and apparatus for measuring the energy input to the rod string of a well pumping unit in real time wherein the load on the rod string is multiplied by the velocity of the rod string and the result integrated over at least a portion of the pump stroke. The change in the energy input to the well is used to determine when the well has pumped-off.

7 Claims, 6 Drawing Figures

METHOD FOR PUMP-OFF DETECTION

RELATED PATENTS

The present invention is closely related to U.S. Pat. No. 3,951,209 and a co-pending application of F. A. Womack and D. F. Jahns entitled "PUMP-OFF CONTROL FOR ROD PUMPED WELLS", Ser. No. 701,744, Filed July 2, 1976, now U.S. Pat. No. 4,015,469.

BACKGROUND OF THE INVENTION

The present invention relates to the control of rod type pumping units used in the production of crude oil. In a rod type pumping unit, a reciprocating pump is located at the bottom of the well and actuated by a string of pump rods extending up the well to the surface. At the surface a beam pumping unit reciprocates the rods to actuate the pump. The pump has a stationary valve at the bottom and a traveling valve in the piston with the stationary valve opening on the upstroke of the piston to allow fluid from the formation to flow into the pump barrel. On a succeeding downstroke the stationary valve closes while the traveling valve in the piston opens to allow the fluid in the pump barrel to flow through to the top of the piston. On the succeeding upstroke the fluid on top of the piston is lifted to the surface of the well. The beam pumping unit at the surface is normally driven by an electric motor with provisions being made for controlling the starting and stopping of the motor depending upon the fluid level in the well. As explained in the above patents when there is insufficient fluid in the well, the pump barrel is not completely filled on the upstroke and on the succeeding downstroke the rod string and piston fall free due to the weight of the rod string and the column of oil above the piston until it contacts the oil. By falling free, the piston will build up sufficient speed to cause considerable shock loads to occur in the pumping unit when the piston contacts the fluid in the pump barrel. The mechanical shock results in considerable pounding and vibration of the pump unit and causes considerable damage. Thus, many attempts have been made to determine when the pump barrel does not completely fill with fluid so that the pump unit can be shut down to allow additional fluid to drain in to the reservoir. The condition of the pump barrel not filling with fluid is normally referred to as pumped-off condition while the complete filling of the pump barrel is referred to as a pumping or full-pump condition.

The above patents describe a method in which the load on the rod string and the displacement of the rod string are used to determine the energy input to the rod string. The energy input is determined by computing the area of the dynamometer card for the well. The energy input is then compared with the energy input under full-pump conditions to determine when the well has been pumped-off in order to control the pumping unit. While this approach is successful, it requires the accumulation of the load and displacement data for a complete cycle of the pump before the energy input to the rod string can be determined. Further, the data must either be plotted to form a pump dynamometer card or must be manipulated in a computer to determine the area of the dynamometer card. This means that the determination cannot be made in real time.

BRIEF DESCRIPTION OF THE INVENTION

The present invention solves the above problems by computing energy input using the load on the rod times the velocity of the pump rod and integrating the result with respect to time over at least a portion of the pump stroke. Of course, as explained in the above U.S. Pat. No. 4,015,469 superior results can be obtained by considering only a portion of the pump stroke. This approach provides a greater difference in energy input between full-pump condition and a pumped-off condition in the well. By using velocity instead of displacement the energy input to the well computed be computedj in real time and there is no necessity of storing the data for a complete pump stroke. Further, since the computation can be made in real time analog circuits can be used to compute the energy input which will provide a continuous output of information for the operator or control system. In addition, the information can be used to control the operation of the pumping unit to provide a duty cycle which will prevent the pumping-off of the well yet insure maximum production from the well.

In addition, it has been discovered that the velocity of the pump rod can be closely simulated by a sine wave signal. Thus, a sine wave signal having a frequency equal to the pump frequency can be generated and used directly as a velocity input to the circuit. This eliminates the need to measure the actual velocity of the rod string and only the load on the rod string is necessary to compute the energy input to the well.

BRIEF DESCRIPTION OF THE DRAWINGS

The present invention will be more easily understood from the following detailed description when taken in conjunction with the attached drawings in which.

PREFERRED EMBODIMENT

Figure 1:
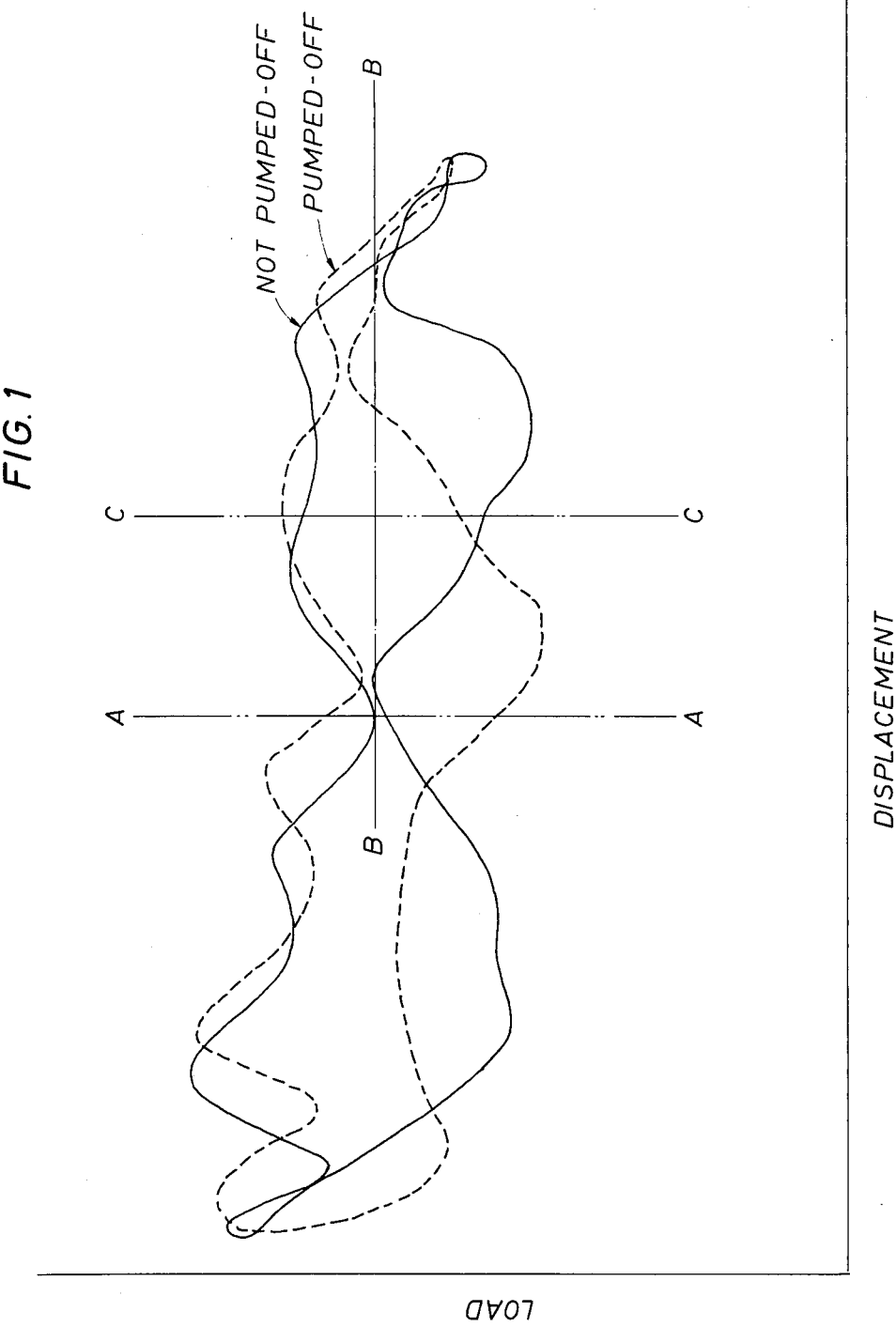
FIG. 1 shows two pump cards, one illustrating a full-pump and the other illustrating a pumped-off condition.

Referring now to FIG. 1, there is shown two pump cards, the card with the solid line representing a pump with a full-pump condition and the card drawn with the dotted line representing a pumped-off condition. The area enclosed within the two cards of course represents the energy input to the rod string in each case. By comparing the two areas, one can determine the energy input to the well for a full-pump and a pumped-off condition. In the cards illustrated in FIG. 1 the difference amounts to approximately 6 percent of the total area of the cards. As explained in the above U.S. Pat. No. 4,015,469 this small difference makes the detection of a pumped-off condition extremely difficult in some cases. In order to solve this problem, U.S. Pat. No. 4,015,469 suggests that only a portion of the pump card equally disposed on both sides of the top of the pump stroke be considered.

An equal reduction in energy can be obtained by considering the area to the right of line AA and below line BB. Further reduction in some wells can be accomplished by considering the area to the right of line CC and below line BB. When only this portion of the pump card is considered one can see that the energy input to the rod string for a pumped-off condition is extremely low while the energy input for a pumping condition is high. This results from the free falling of the rod string and the pump piston until the piston actually contacts the fluid in the pump barrel when pump-off occurs. The load on the rod on the downstroke will be substantially equal to the load on the rod on the preceding upstroke and the net energy input to the rod will be substantially zero.

The above patents all depend upon the integration of the load on the rod times the displacement of the rod to measure the energy input to the rod. As is appreciated, the integration of the load times displacement cannot be performed in real time to calculate input energy. The energy input to the rod can also be expressed in terms of rod velocity as follows:

$$E = \int_0^T F(t) \frac{dl}{dt} dt$$

where:
$T$ = Pump Period
$F$ = Load on Rod
$dl/dt$ = Velocity of Rod

In the above patents, load and displacement are measured as functions of time. Since velocity is the time derivative of displacement, both the force and velocity are functions of time and can be multiplied together and integrated to give the input energy. This is done in real time without the necessity of storing the information. A still further simplification of this equation is possible since as it was explained above, the velocity of the rod is subtantially a sine wave character. Thus, assuming that the rod velocity does have a sine wave characteristic, the above equation can be rewritten as follows:

$$E = \int_0^T F(t) \sin 2\pi t \, dt ,$$

where
$T$ = Pump Period,
$F$ = Load on Rod, and
$\sin 2\pi t$ = Simulated Velocity of Rod.

Figure 2:
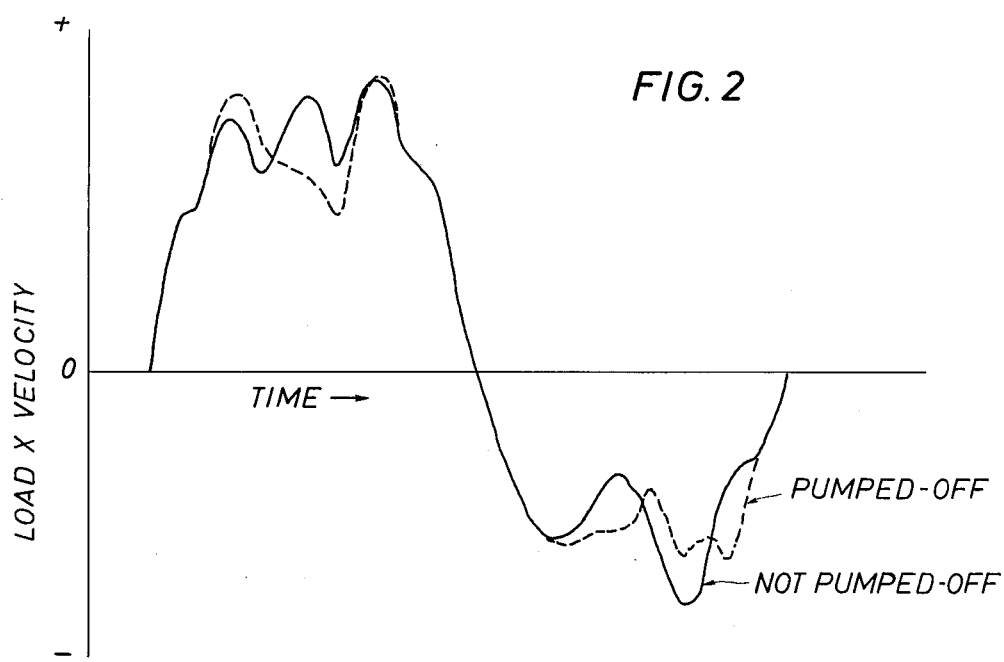
FIG. 2 illustrates a plot of load times velocity for both a full-pump and a pumped-off condition.
Figure 3:
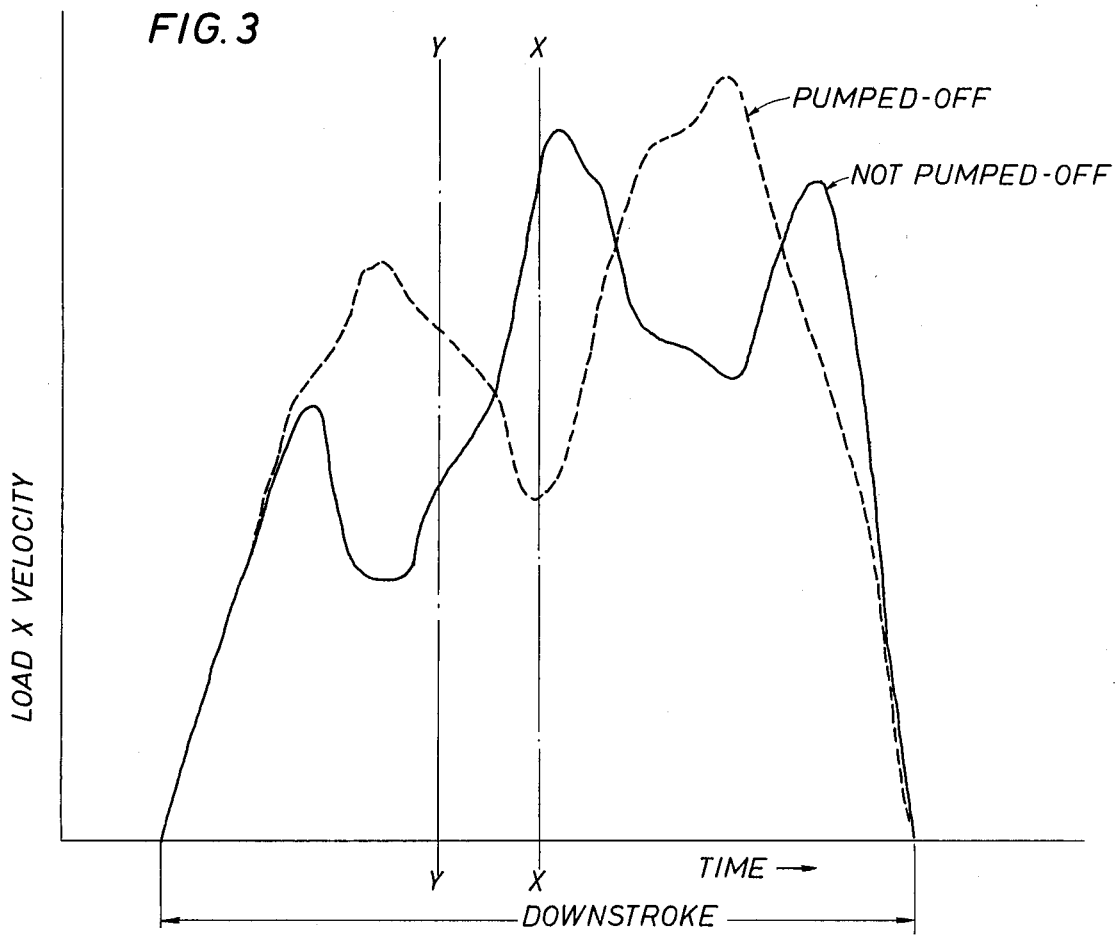
FIG. 3 illustrates the rectified negative portion of a plot of load times velocity for both a full-pump and a pumped-off condition.

When the above equations are solved either by evaluating the functions of load and velocity or by substituting a sine wave for the velocity, one will obtain a curve similar to that shown in FIG. 2. The solid curve in FIG. 2 illustrates the load times the velocity with respect to time for a full-pumped well while the dotted curve represents the well in a pumped-off condition. From an inspection of the curve of FIG. 2, it is appreciated that the greatest difference between the full-pump and the pumped-off condition exists when the curve has a negative value. Thus, superior results can be obtained by evaluating the curve only in the negative region or only in part of the negative region. This can be accomplished electronically by inverting the output signal and rectifying it to remove the once positive portion of the curve. As explained in the U.S. Pat. No. 4,015,469; still further improvement can be realized by utilizing only a portion of the total pump stroke in evaluation. Referring to FIG. 1, the area to the right of line AA and below line BB is the area in FIG. 3, to the left of line XX. The area in FIG. 1 to the right of line CC and below line BB is the area to the left of line YY. Preferably this part of the pump stroke has only portions beginning with the down movement of the rod pump. In FIG. 3, one will note that the condition of pump-off causes the negative area to be larger than the negative area of a well that is not pumped-off. Thus, in evaluating the results of this system, one must realize that the negative energy increases as the well is pumped-off.

Figure 4:
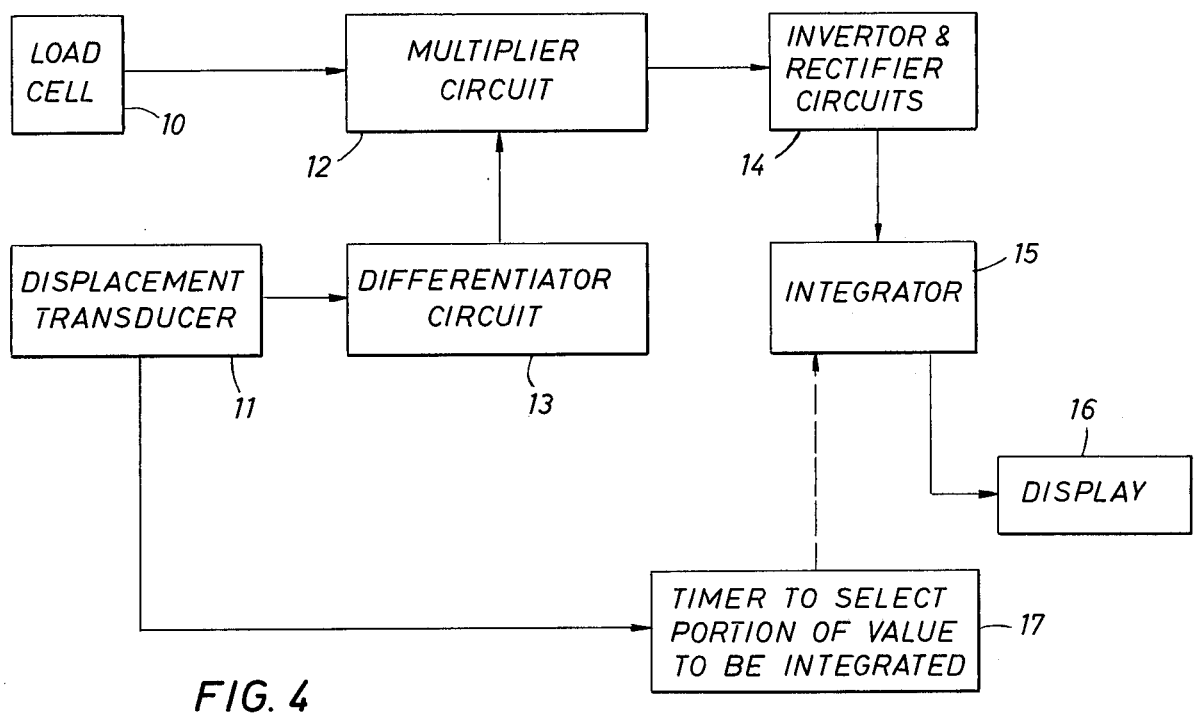
FIG. 4 illustrates in a block diagram form a circuit suitable for performing the calculations of the present invention where both load and velocity are measured.

If one utilizes this version which measures the velocity and the load, analog circuits may be used for solving the first equation. In particular, in FIG. 4, there is shown a block diagram form of one circuit. The circuit comprises a load cell 10 mounted on the pumping unit to measure the load and the rod displacement. The load cell may be either mounted in the rod string or may be mounted on the beam which actuates the rod string. The displacement measurement 11 of the rod may be measured in a manner correlatable with the measurement of the load in the rod or may be measured indirectly by measuring the angle of the pump beam. The load cell signal is supplied to an analog multiplying circuit 12 that also receives a signal from the differentiator 13. The input to the differentiator is from the displacement transducer 11 previously mentioned. The output from the multiplier circuit is inverted and rectified by a circuit 14 and then integrated or summed up by the integrating circuit 15. The integrating circuit may be one in which the analog signal is converted to a related frequency whose pulses are counted and stored in a suitable means. The storage signal can be displayed on a display 16 in a digital form if so desired or used to actuate a chart recorder to produce curves similar to those shown in FIG. 3. Likewise, the integrated signal can be used to select only a portion of the total pump stroke during which the value of the signal is integrated.

Figure 5:
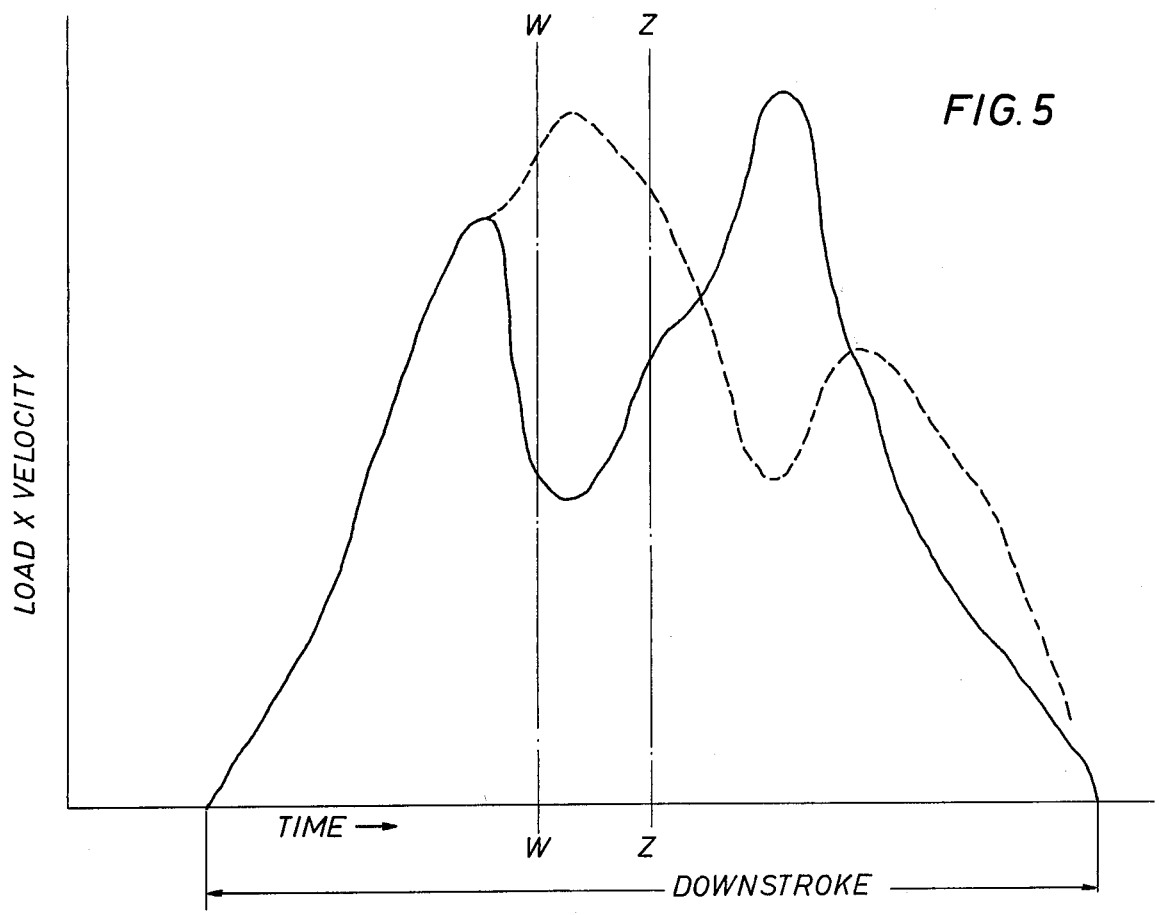
FIG. 5 illustrates the rectified negative portion of a plot of load times simulated velocity for both a full-pump and a pumped-off condition.
Figure 6:
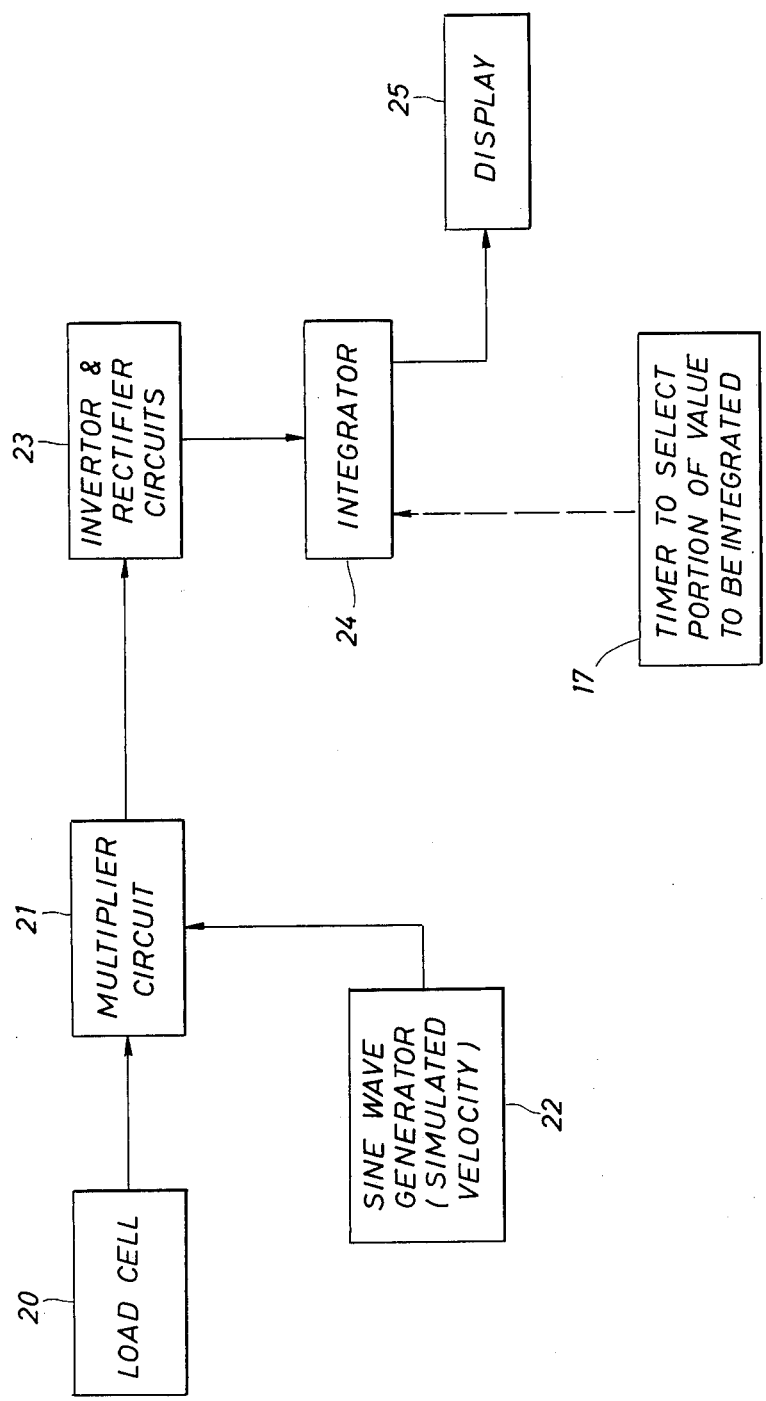
FIG. 6 illustrates in a block diagram form a circuit suitable for performing the calculations of the present invention where load is measured and velocity simulated by a sine wave.

If one utilizes the simplified version in which a sine wave is substituted for the actual velocity of the rod, analog circuits may also be used for solving the second equation. In particular, FIG. 5 shows the results of the second equation for the same load data displayed in FIG. 1 and again in FIG. 3. In this figure, the area to the left of line ZZ is the same as the area below line BB and to the right of line AA in FIG. 1 and the area to the left of line WW is the same as the area below line BB and to the right of line CC in FIG. 1. As previously explained, this integration of a negative area further improves or enhances the energy change that can be realized by utilizing only a portion of the total pump stroke. Again, only the beginning of the downstroke is used.

If one utilizes the simplified version in which a sine wave is substituted for the actual velocity of the rod string, analog circuits again may be used for solving the second equation. The circuit comprises a load cell 20 mounted on the pumping unit to measure the load on the rod string. As before, the load cell may be either mounted in the rod string or may be mounted upon the beam which actuates the rod string. The load cell signal is supplied to an analog multiplying circuit 21 that also receives a signal directly from a sine wave generator 22 simulating velocity. In this simplified system, there is no need to have a differentiator since the velocity is approximated by a sine wave. The sine wave generator should preferably have an adjustable period so that the period of the sine wave exactly equals the period of the pump. The output from the multiplier circuit is then inverted and rectified by a circuit 23 and then integrated or summed up by an integrating circuit 24. The integrating circuit may be a circuit in which the analog signal is converted to a related frequency whose pulses are then counted and stored in a suitable storage means. The storage signal may be displayed on a display 25 in a digital form if so desired or used to actuate a chart recorder to produce curves similar to those shown in FIG. 5. Likewise, the integrated signal can be used as a signal for controlling a pumping unit as explained in the above Pat. No. 3,951,209. The timing circuit 17 can be used to select the portion of the total pump stroke during which the signal is integrated.

I claim as my invention:

1. A method for measuring the energy input to the rod string in a rod pumping unit comprising:
   measuring the load on the rod;
   obtaining the velocity of the rod; and
   multiplying the load times the velocity and integrating the product to obtain the energy input for each stroke in real time.

2. The method of claim 1 wherein the velocity is obtained by measuring the displacement of the rod and determining the first derivative thereof.

3. The method of claim 1 wherein the velocity is approximated using a sine wave having a period equal to the time required for a complete pump stroke.

4. The method of claim 3 wherein energy input for only negative velocity is measured.

5. The method of claim 4 wherein only a portion of the energy input for negative velocity is measured.

6. A method for determining when a rod pumped well has pumped-off comprising:
   measuring the load on the rod string and producing an analog electrical signal;
   simulating the velocity of the rod string by a sine wave electrical signal having a period equal to the time required for the pump to make a complete stroke;
   multiplying the load signal by the simulated velocity;
   integrating the negative values of said multiplication to obtain the negative energy input to the rod string; and
   comparing said negative energy input with predetermined value to determine when said well is pumped-off.

7. The method of claim 6 wherein only a selected portion of said negative values are integrated.

* * * * *